United States Patent
Zygan-Maus et al.

(10) Patent No.: US 7,190,779 B1
(45) Date of Patent: Mar. 13, 2007

(54) METHOD AND APPARATUS FOR HANDLING CALLS REQUIRING THE SUPPORT OF AN INTELLIGENT NETWORK

(75) Inventors: Renate Zygan-Maus, München (DE); Hanspeter Ruckstuhl, Wolfratshausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,406

(22) PCT Filed: Oct. 1, 1999

(86) PCT No.: PCT/EP99/07311

§ 371 (c)(1), (2), (4) Date: Mar. 30, 2001

(87) PCT Pub. No.: WO00/21309

PCT Pub. Date: Apr. 13, 2000

(30) Foreign Application Priority Data

Oct. 1, 1998 (EP) .................................. 98118584

(51) Int. Cl.
H04M 7/00 (2006.01)
(52) U.S. Cl. ............................ 379/221.08; 379/221.09; 379/221.12; 379/221.13
(58) Field of Classification Search ................................ 379/221.08–221.13, 230
See application file for complete search history.

(56) References Cited

U.S. PATENT DOCUMENTS

| | | | | |
|---|---|---|---|---|
| 5,517,563 A | * | 5/1996 | Norell ........................ | 379/230 |
| 5,598,464 A | * | 1/1997 | Hess et al. ............. | 379/211.03 |
| 5,764,745 A | * | 6/1998 | Chan et al. ............. | 379/221.13 |
| 5,867,570 A | * | 2/1999 | Bargout et al. ........ | 379/221.13 |
| 5,946,383 A | * | 8/1999 | Havens et al. ......... | 379/221.09 |
| 6,047,055 A | * | 4/2000 | Carkner et al. ........ | 379/221.13 |
| 6,611,584 B1 | * | 8/2003 | Khello et al. .......... | 379/201.03 |

FOREIGN PATENT DOCUMENTS

| | | |
|---|---|---|
| EP | 0 827 319 A2 | 3/1998 |
| GB | 2 315 953 A * | 2/1998 |

OTHER PUBLICATIONS

Swift, D J, et al., "Number Portability—an Opertunity for Alternative Carriers", British Telecommunications Engineering, vol. 17, No. Part 2, (1998), pp. 83-87.
Giordano, A et al., "PCS Number Portability", IEEE International Symposium on Personal, Indoor and Mobile Radio Communications, (1994), pp. 1146-1150.

* cited by examiner

*Primary Examiner*—Bing Q. Bui
(74) *Attorney, Agent, or Firm*—Foley & Lardner LLP

(57) ABSTRACT

A method and apparatus for handling network calls that require the support of an intelligent network. From a query by the switching center, an intelligent network is being determined based on which basis network the received call is being initiated from. The network calls' handling is then supported by the determined intelligent network.

8 Claims, 2 Drawing Sheets

METHOD AND APPARATUS FOR HANDLING CALLS REQUIRING THE SUPPORT OF AN INTELLIGENT NETWORK

BACKGROUND OF THE INVENTION

1. Field of the Invention

The present invention relates to a method and apparatus for handling network calls, and in particular to an interaction between a basic network and an intelligent network for handling network calls that require the support of the intelligent network.

2. Description of the Related Art

As the markets for public telecommunications services open up, call number portability is also required for IN service call numbers in many countries, that is to say IN service subscribers can keep their IN service call number when they change to another network operator/service provider.

An AT&T method for providing call number portability is known from the document EP-A-0 827 319. According to this method, when a call is made using a ported subscriber call number from a switching center, a query to a service platform (SCP) of an intelligent network for supporting handling of the call is started. The service platform (SCP) responds to the query by reporting to the switching center the "Location Routing Number", on the basis of which the switching center routes the call to what is now the end switching center of the ported subscriber.

When a number of intelligent networks are present, operators of a public network must be able to route calls to individual IN service call numbers to that (intelligent) network which is supporting this IN service call number. Previously known solutions can lead to capacity problems in the IN service platforms (service control point SCP) or in the switching centers in the basic network (an intelligent network (IN) may be regarded as a basic network to which the IN functions comprising the service switching function SSF, service control function SCF, service management function SMF and the corresponding interfaces to the basic network have been added. Thus, in contrast to a basic call, an IN call requires not only the basic network functionality, but also the specific IN functions).

Normal IN services are those in which the public number dialed to set up a connection itself uniquely identifies the IN service subscriber. This is generally the case with dialed IN services. Possible special forms of dialed IN services, in which the IN service subscriber call number is checked only after accessing the IN service, using a dialog via the user channel, can in principle still be handled in the same way as normal IN services once the IN service subscriber call number has been received.

Previous solutions for IN service call number portability can be split into two categories:

A. Solutions with reactions on one's own IN service platform

B. Solutions with a query to a call number portability server before a query to one's own IN service platform.

A) Solutions with Reactions on one's own IN Service Platform

In these solutions, a normal IN query to one's own IN service platform is carried out by the basic network for all IN service call numbers (those which are supported by one's own IN service platform and those which are supported by service platforms in other networks). The IN service platform confirms whether it is supporting the dialed IN service call number or whether the dialed IN service call number is being supported by another network. In both cases, the IN service platform indicates to the requesting basic network switching center via the existing IN signaling how the call is to be handled further. For example, the IN service platform can instruct the switching center to pass on the call to the responsible network, by determining a network identification and reporting this to the switching center as routing information.

In Type A solutions, the capacity of the IN service platform is partially consumed for handling external IN service call numbers, which can lead to capacity bottlenecks for handling its own IN service call numbers. Since the basic network uses the same trigger mechanism for its own and for external IN service call numbers, load limitation procedures must not be used for queries from the IN service platform in the switching centers (call gapping functions) which would also affect external IN service call numbers (for example a service-related load limit).

B) Solutions with a Query to a Call Number Portability Server Before a Query to one's own IN Service Platform In order to ensure that one's own IN service platform need handle only its own IN service call numbers, the basic network uses the IN signaling to ask for a special call number portability server (NP server; NP=Number Portability) for all the dialed IN service call numbers. The NP server confirms whether the dialed IN service call number is being supported in its own network or in another network. The NP server uses the IN signaling to instruct the requesting switching center how the call is to be handled further. For its own IN service call numbers, the basic network carries out a normal IN query to its own IN service platform following a query from the NP server. For external IN service call numbers, the call is routed to the responsible external network in accordance with the instructions from the NP server. In Type B solutions, the capacity of one's own IN service platform is protected, but additional basic network capacity is required for this purpose for prior queries in the case of a special NP server. If decoupled trigger mechanisms are used for the prior query in the case of the NP server and for the subsequent query in the case of one's own IN service platform, service-related and call-number-related load limitation procedures can be used without any restriction for the IN service platform (call gapping functions) in the switching centers.

SUMMARY OF THE INVENTION

The invention is based on the object of specifying a method for handling IN calls which allows IN service call number portability to be provided without any additional capacity requirements for the switching centers or the IN service platforms in the public telephone network.

An exemplary embodiment of the invention will be described in the following text with reference to the drawing, which comprises two figures.

An NP server provides a call number portability function, which will be described in more detail in the following text, is initiated by a normal IN query from a switching center in the basic network, and can pass this IN query on to an IN service platform in its own network, if this is a query to one of its own IN service call numbers.

The method according to the invention does not require any additional capacity, either in the switching centers in the basic network or in the IN service platforms.

When the method according to the invention is used, the IN load limitation procedures in the switching centers for IN queries to the IN service platforms (call gapping functions) are in fact no longer used, since they could also relate to external IN service call numbers. Other load limitation mechanisms, for example in the NP server, can be used instead of the load limitation procedures in the switching centers.

DETAILED DESCRIPTION OF THE PREFERRED EMBODIMENT

In the more detailed explanation of the method according to the invention which now follows, the standardized signaling system #7 is assumed by way of example as the signaling system on which the intelligent network is based. However, the invention can also be used when signaling methods other than the method according to #7 are used for transporting application data (TCAP, INAP). If IP (Internet Protocol) is used, the IP address would need to be assessed and manipulated instead of the SCCP GlobalTitles (Note: examples already exist where IP is used for transportation of application data in conventional telecommunications networks (PSTN, PLMN)).

A switching center in the basic network identifies a dialed IN service call number. When a sufficient number of dialed digits are present in order to uniquely identify the IN service subscriber, the switching center sends an IN query (containing the dialed IN service call number) in accordance with the normal IN signaling procedure for its network to an NP server according to the invention. The passing of the message via the NP server is transparent to the switching center, that is to say the switching center "thinks" that it is passing the IN query to an IN service platform.

When, for example, using ETSI signaling standards, the switching center sends the following SCCP/TCAP message:

SCCP/TCAP message "UNIT-DATA/BEGIN", which contains the INAP operation "InitialDP" with the parameters
    servicekey=IN service identification (for example for personal call numbers)
    calledPartyNumber=contains a dialed IN service call number.

The SCCP address of the NP server is stored as the Global Title X in the switching center.

Figure 1:
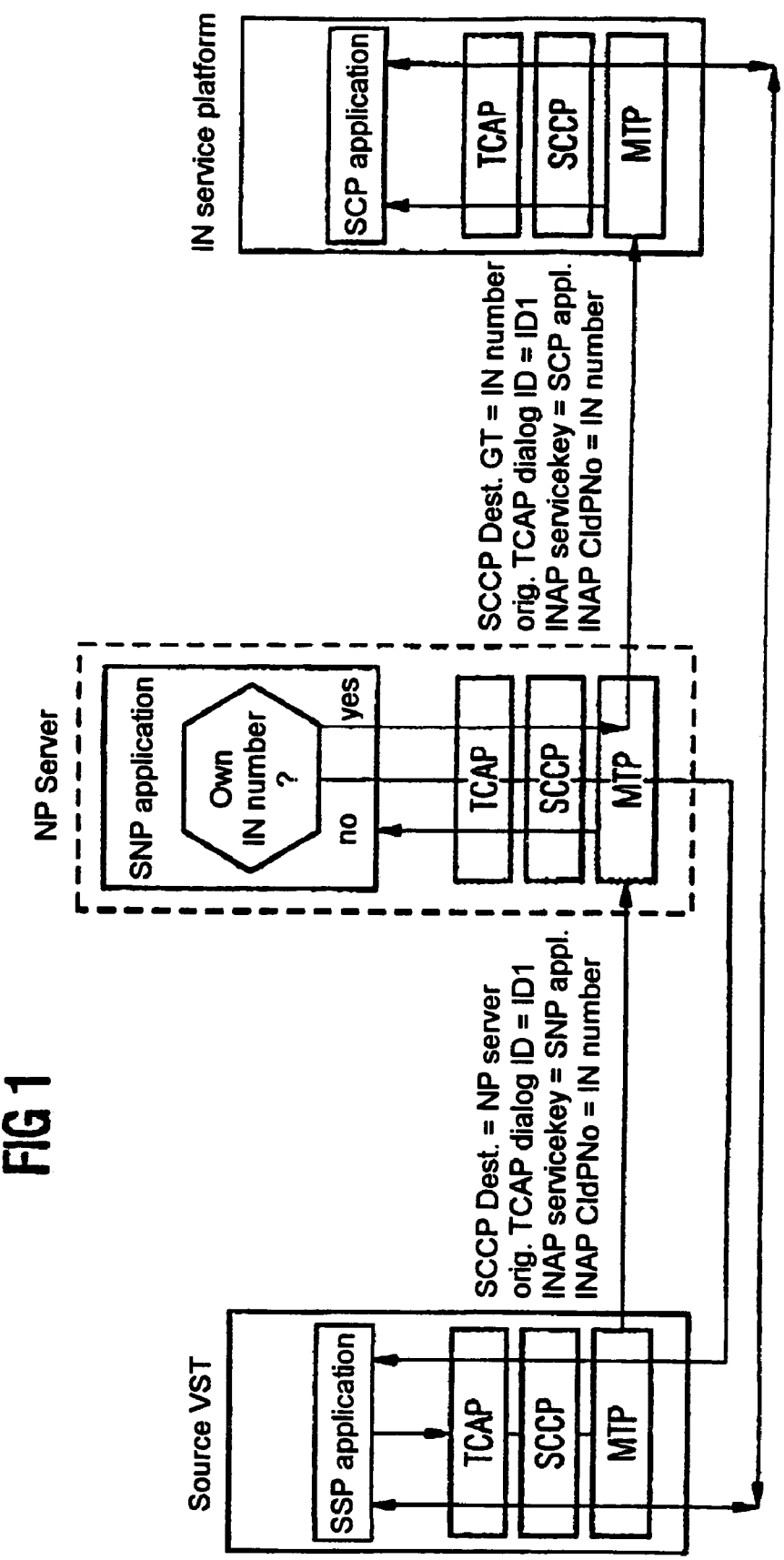
FIG. 1 is a schematic illustration of solutions with reaction's on one's own intelligent network service platform according to the present invention.
Figure 2:
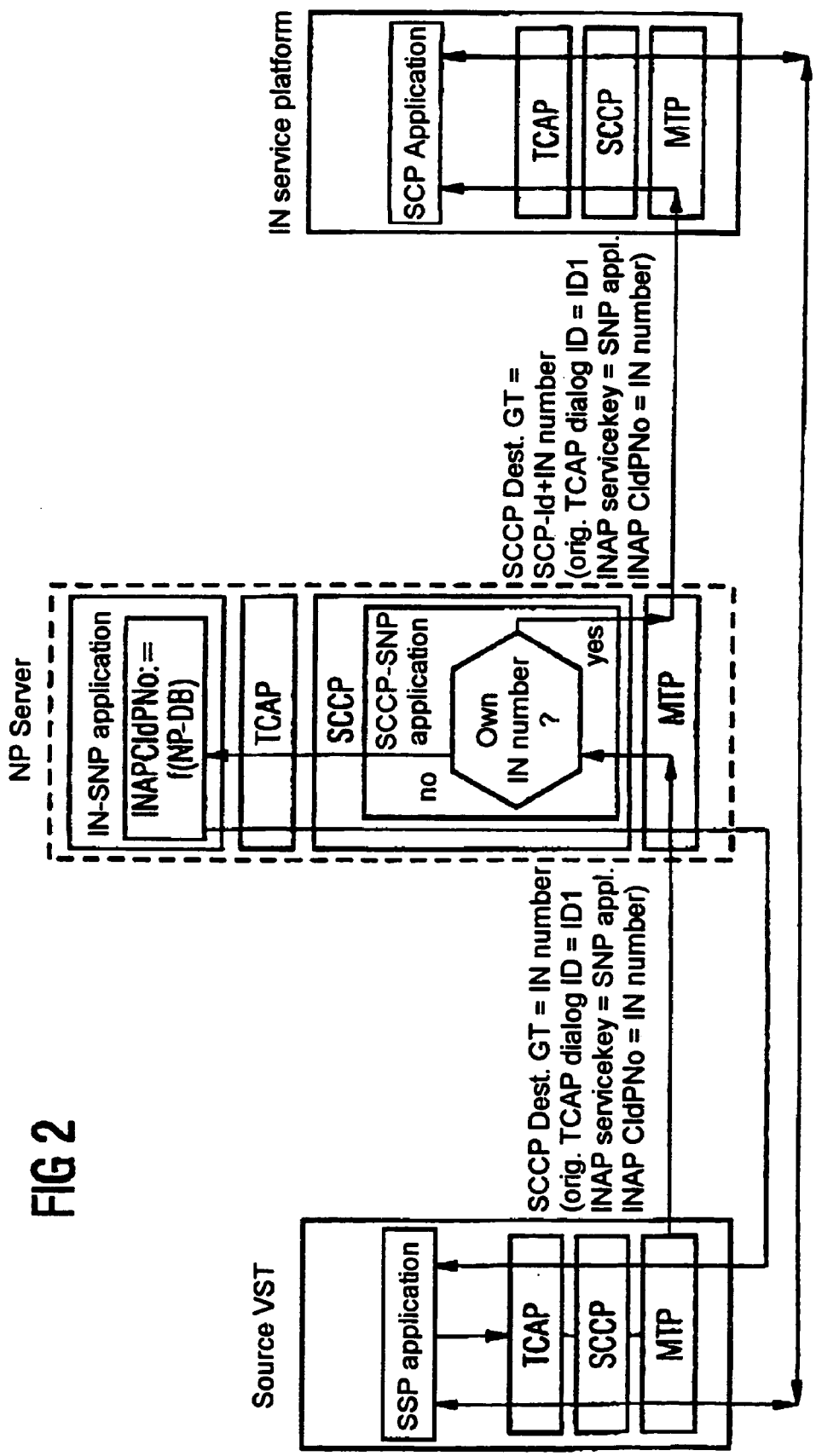
FIG. 2 is a schematic illustration of solutions with a query to a call number portability server before a query to one's own intelligent network service platform based on the present invention.

There are two possible versions which can be used for the rest of the procedure, which are referred to in the following text as (solution) version a) and b) whose explanation will be assisted by FIG. 1 (version a)) and FIG. 2 (version b)).

Version A):

The INAP message is evaluated in the NP server, and the servicekey parameter is used to branch to a specific IN service call number portability program (SNP application, where SNP=Service Number Portability). This program checks which network is supporting the dialed IN service call number. If the IN service call number is being supported by another network, the NP server determines the required routing information (for example the network identification of a gateway node to the other network) and instructs the requesting switching center to route the call to this gateway.

If ETSI signaling standards are being used, the NP server in this case sends, for example, the following SCCP/TCAP message to the switching center: within an SCCP/TCAP message UNIT-DATA/END the INAP-Operation Connect with the parameters
    destinationRoutingAddress=network identification
    cutAndPaste=0.

If the IN service call number is being supported by its own network, the NP server uses the IN service call number to determine an SCCP address for its own responsible IN service platform; for example, the IN service call number can itself be used as the global title for SCCP addressing of the IN service platform. The NP server passes the original message from the switching center via the #7 signaling network on to its own responsible IN service platform. The NP server can make the process of passing on the message dependent on IN service platform-related overload control criteria. If a message cannot be passed on, the NP server can instruct the sending switching center to cancel the call.

If, for example, ETSI signaling standards are being used, the NP server sends the following SCCP/TCAP message:

within an SCCP/TCAP message UNIT-DATA/BEGIN the INAP-operation InitialDP with the parameters
    servicekey=IN service identification (for example for personal call numbers)
    CalledPartyNumber=dialed IN service call number.

The original message remains unchanged even at the TCAP level. In particular, the NP server uses the same TCAP dialog ID allocated by the switching center. At the SCCP level, the NP server indicates as the destination address the new SCCP address which has been determined, for example the SCCP-GlobalTitle=dialed IN service call number. The NP server quotes the source of the message as the SCCP address received in the original message from the requesting switching center.

The passing of the message through the NP server is thus transparent to the IN service platform, that is to say the IN service platform "thinks" that it has received the IN query directly from the switching center. The IN service platform thus processes the IN query in the same way as a direct IN query from the switching center, and sends an appropriate response to the switching center.

Version B):

The SCCP message is already evaluated in the NP server; a specific SCCP service call number portability program (SCCP-SNP application) checks the network operator to which the SCCP address, which was derived in the SSP from the dialed IN service call number, belongs.

Owing to the large amount of data, the SNP (Service Number Portability) program and associated data are best located at a central point. This can be done by integration with a Signaling Transfer Point/Signaling Relay Point (STP/SPR), and possibly also with an SCP. Integration with the SSP is also possible, but is less attractive.

If the SCCP address and/or IN service call number belongs to another network, the INAP message is passed on via TCAP to an IN service call number portability program. This checks the network operator which is supporting the dialed IN service call number, determines the required routing information and instructs the requesting switching center to route the call to this network (see Version 2a).

If, in contrast, the SCCP address and/or IN service call number is being supported by its own network, the NP server uses the SCCP CdPN to determine a new SCCP address for its own responsible IN service platform. The NP server passes the original message from the switching center via the #7 signaling network on to its own responsible IN service platform. This solution version allows the SCCP/TCAP message to be passed on without including the TCAP and application levels, and is thus dynamically better than Version 2a.

The following applies in the same way to the two versions mentioned:

An IN service platform receives from the switching center the IN query passed on from the NP server. The process of passing the message via the NP server is transparent to the IN service platform, that is to say the IN service platform "thinks" that it has received the message directly from a requesting switching center. The IN service platform thus processes the IN query in the same way as a direct IN query from the switching center, and thus also sends the response to the IN query to the switching center, and not to the NP server.

The passing of the message via the NP server is likewise transparent to the switching center. The TCAP dialog initiated by the switching center is controlled by the IN service platform in accordance with the standardized TCAP procedures.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A method for handling intelligent network (IN) calls identified by a switching center having Service Switching Point (SSP) functionality, the method comprising the steps of:
    providing an IN query in the switching center relating to an IN call;
    sending the IN query to a number portability (NP) server, wherein the IN query appears to the switching center to be sent directly to a service platform having Service Control Point (SCP) functionality, and wherein the IN query is not sent to the NP server via the service platform;
    utilizing the IN query in the NP server to determine a network operator supporting the IN call; and
    passing the IN query to a service platform associated with an intelligent network of the network operator so that the IN query appears to the service platform to come from the switching center.

2. A method according to claim 1, further comprising the step of:
    evaluating an Intelligent Network Application Part (INAP) part of a signaling message part of the IN query to determine the network operator.

3. A method according to claim 1, further comprising the step of:
    evaluating a Signaling Connection Control Part (SCCP) part of a signaling message part of the IN query to determine the network operator.

4. A method according to claim 1, wherein the IN query is transmitted by utilizing a signaling system no. 7.

5. A method according to claim 1, wherein the IN query is transmitted by utilizing an Internet Protocol (IP) based network.

6. A method according to claim 2, further comprising the steps of:
    responding to the IN query via the NP server stating routing information relating to a gateway of the network operator; provided that the IN call is not initiated in a basic network based on the intelligent network, and if so;
    passing the IN call to the gateway.

7. A system for handling a network call, comprising:
    a server;
    a switching center;
    an intelligent network (IN) with a service platform; and
    a basic network being based on the intelligent network;
    the server receiving an IN query from the switching center, the IN query relating to a call received by the basic network, the server utilizing information contained in the IN query for determining whether the intelligent network supports the call, and if so, the server passing the IN query to the service platform;
    wherein the IN query appears to the switching center to be sent directly to the service platform, and wherein the IN query is not sent to the server via the service platform.

8. A system according to claim 7, further comprising the step of:
    responding via the server to the IN query by stating routing information relating to a gateway in the basic network provided that the call is not initiated in the basic network.

* * * * *